United States Patent
Verwold

(10) Patent No.: US 6,782,603 B2
(45) Date of Patent: Aug. 31, 2004

(54) MANUFACTURE OF A FOLDING TOP FOR A CONVERTIBLE

(75) Inventor: Andreas Verwold, Hasbergen (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 78 days.

(21) Appl. No.: 10/072,723

(22) Filed: Feb. 6, 2002

(65) Prior Publication Data

US 2002/0116806 A1 Aug. 29, 2002

(30) Foreign Application Priority Data

Feb. 27, 2001 (DE) .......................................... 101 09 414

(51) Int. Cl.[7] ................................................ H05B 3/00
(52) U.S. Cl. .......................... 29/611; 29/281.1; 29/897; 296/107.07; 296/103; 296/210; 160/90; 160/368.1
(58) Field of Search ....................... 29/611, 897, 281.1; 160/90, 368.1; 296/107.07, 210, 103

(56) References Cited

U.S. PATENT DOCUMENTS

| | | | | |
|---|---|---|---|---|
| 5,040,844 A | * | 8/1991 | Stolz et al. | 296/107.07 |
| 5,061,332 A | * | 10/1991 | Stolz et al. | 156/94 |
| 5,600,922 A | * | 2/1997 | Stolz | 52/74 |
| 6,015,181 A | * | 1/2000 | Exner | 296/145 |

FOREIGN PATENT DOCUMENTS

DE        298 17 980        2/2000

* cited by examiner

*Primary Examiner*—Carl J. Arbes
*Assistant Examiner*—Tim Phan
(74) *Attorney, Agent, or Firm*—Jordan and Hamburg LLP

(57) ABSTRACT

A device (6) for producing a folding top (2) of a convertible, which comprises a frame region (4) for gripping a windowpane (3), especially a rear window, at least partially, a part (5) of the folding top (2), including the frame region (4) being holdable and connectable with the windowpane (3), wherein the device (6) comprises a fixing device (8) for holding the windowpane (3) in an accurately fitting manner with respect to the frame region (4).

12 Claims, 8 Drawing Sheets

MANUFACTURE OF A FOLDING TOP FOR A CONVERTIBLE

CROSS REFERENCE TO RELATED DOCUMENT

Figure 1:
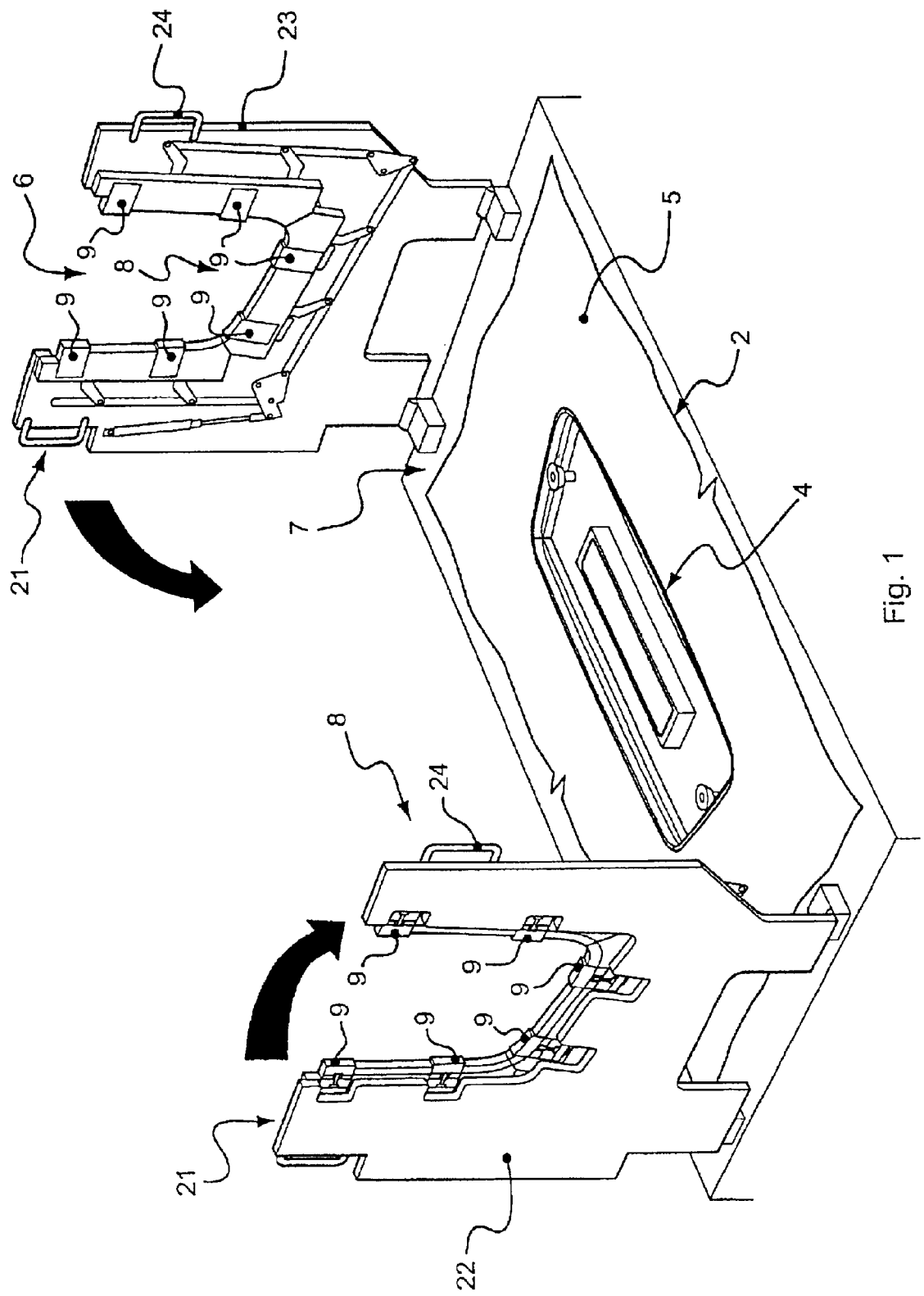

The present application claims the benefit of Germany Application 101 09 414.0, which was filed on 27th Feb. 2001.

BACKGROUND OF THE INVENTION

The invention relates to a device for manufacturing a folding top of a convertible as well as to a method of manufacturing a folding top.

The DE 298 17 980.6 discloses the attachment of a frame region of a folding top to a rear window, which is encircled by this frame region, the rear window itself not forming a frame and being connected directly to the frame region of the folding top by means of an interposed welded sheet. The objective of such a connection is to achieve as flat a frame region as possible, which borders the rear window, or a different window held within the folding top, without a bead-like protrusion, in order to be optically unobtrusive and to ensure good visibility, which is not limited by protruding frames.

Since only a narrow region of the edge of the windowpane is taken hold of by the frame region of the folding top, an accurate alignment of the parts to one another is necessary.

SUMMARY OF THE INVENTION

It is an object of the invention to make it possible to manufacture folding tops by a machine device, the folding tops encircling a windowpane, particularly a rear window, which is encircled directly by a frame region and is otherwise frameless.

By means of the device, an accurately fitting connection between the windowpane and the surrounding frame region can be brought about. At the same time, the frame region can be part of, for example, a flexible folding top fabric and held in the device firmly and aligned. In this position, the rear window is provided and aligned over the fixing device in such a manner, that only a very narrow overlapping region to the rear window is formed. By these means, the field of view can be retained almost over the whole size of the windowpane.

If the fixing device comprises thrust elements, which act on the windowpane over its edges, the windowpane need not be taken hold of by holding elements. A "possibly reactive" adhesive, applied in the edge region of the windowpane, is therefore not affected by the fixing device. The thrust elements preferably are distributed around the windowpane in order to be able to produce a thrust from any direction and thus be able to transfer the windowpane from any defective position into an accurately fitting end position. It is particularly advantageous in this connection if the holding elements are coupled to one another and can be moved simultaneously in this coupled position. The coupling can be constructed in the form of a surrounding strap of a screw clamp, by means of which a force is exerted on all thrust elements in the same way. Accordingly, by exerting tension on the surrounding strap, the same end position of the window frame is necessarily reached without the need for a separate control program for this purpose.

A particularly advantageous development arises if the thrust elements are held at a subassembly, which is to be opened and which, in the open position, does not interfere with the insertion of the windowpane. For example, two pivotable supporting frames can be constructed for this purpose, which can be coupled together in the closed position and thus overlap the frame region of the part encircling the folding top.

For the construction of an electrode for introducing heat, which grips the frame region from below and has a shoulder, the sewing or gluing of a bend of the frame region can be taken into account. The region, turned over, need not extend over the whole width of the electrode. Instead, it need only be a few millimeters up to a few centimeters wide and nevertheless, experience a supporting surface with a uniform heat input from the electrode. However, the shoulder may extend over the whole course of the electrode following the frame region.

It is particularly advantageous if the inside edge of the windowpane is overlapped by a covering strip, in order to achieve an optimally pleasing termination from the inside and to form a mechanically-stable connection by the double holding of the edge of the windowpane from both sides. In order to make such a connection possible, two operational steps are provided in the device. Initially, in the first step, the part of the folding top, encircling the frame region, is connected with the windowpane and, in the second step, the covering strip is welded to the outer part of the folding top.

Further advantages and details arise out of an example of the object of the invention, which is shown in the accompanying drawings.

IN THE DRAWINGS

Figure 2:
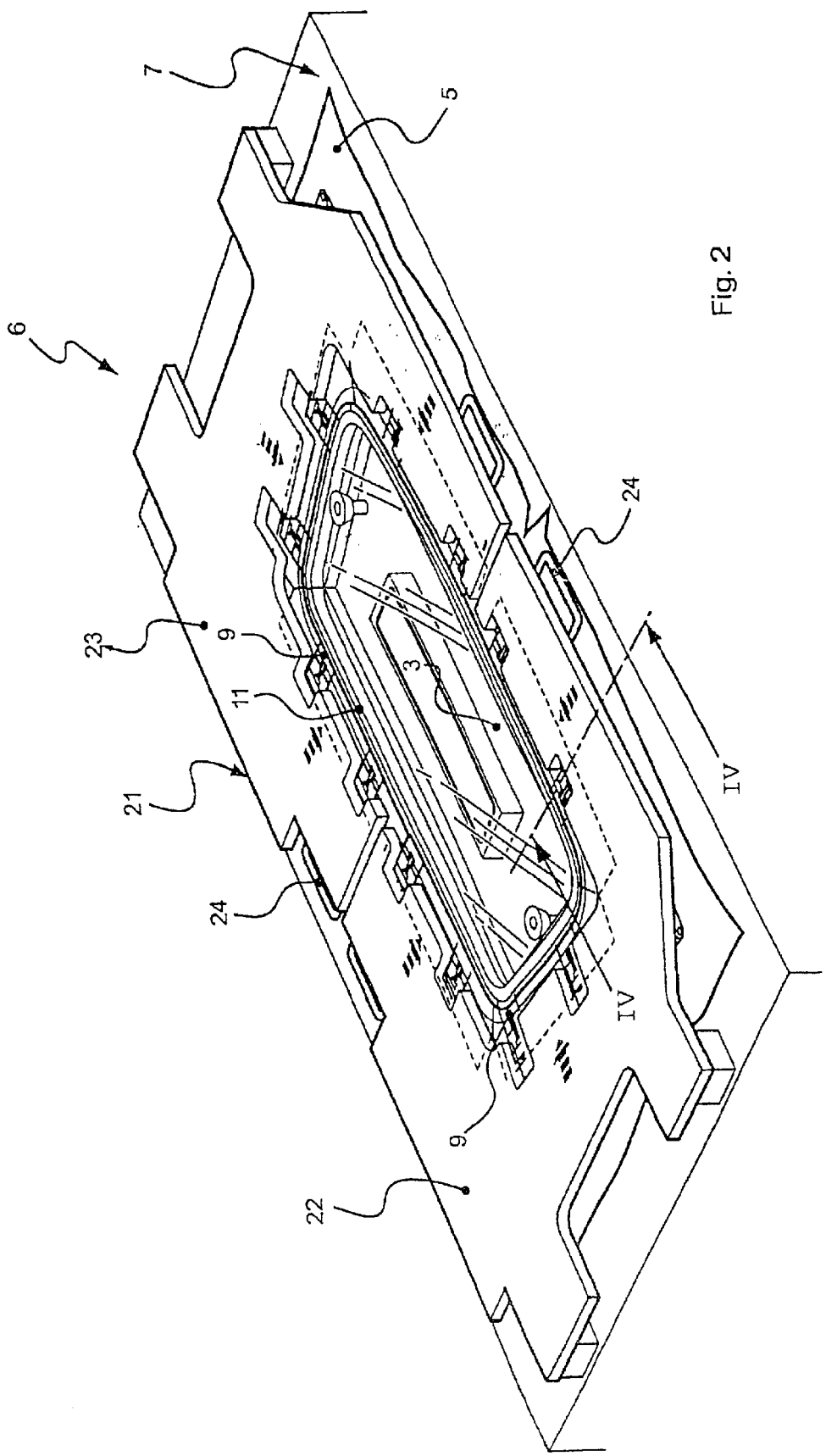
Figure 3:
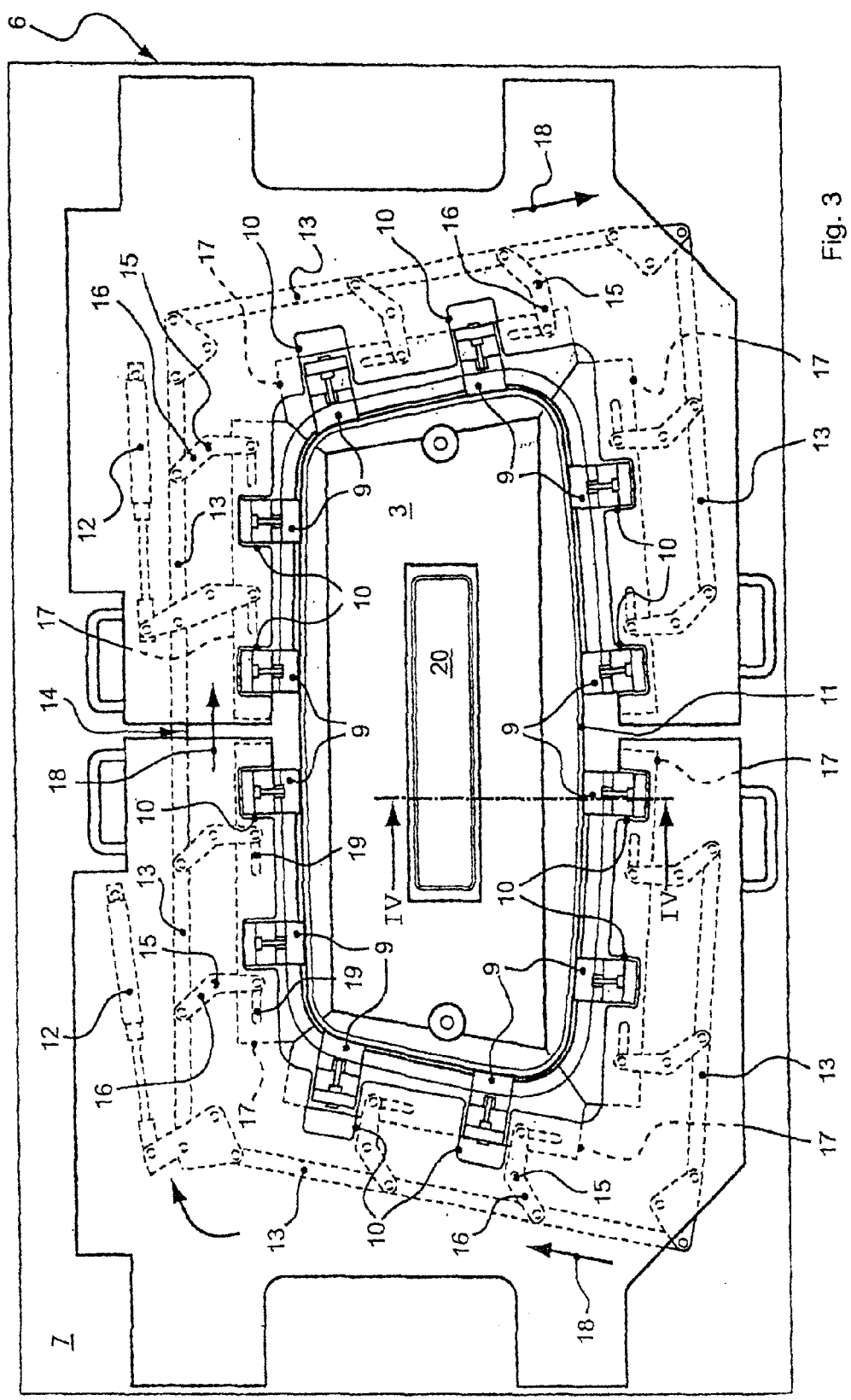
Figure 4:
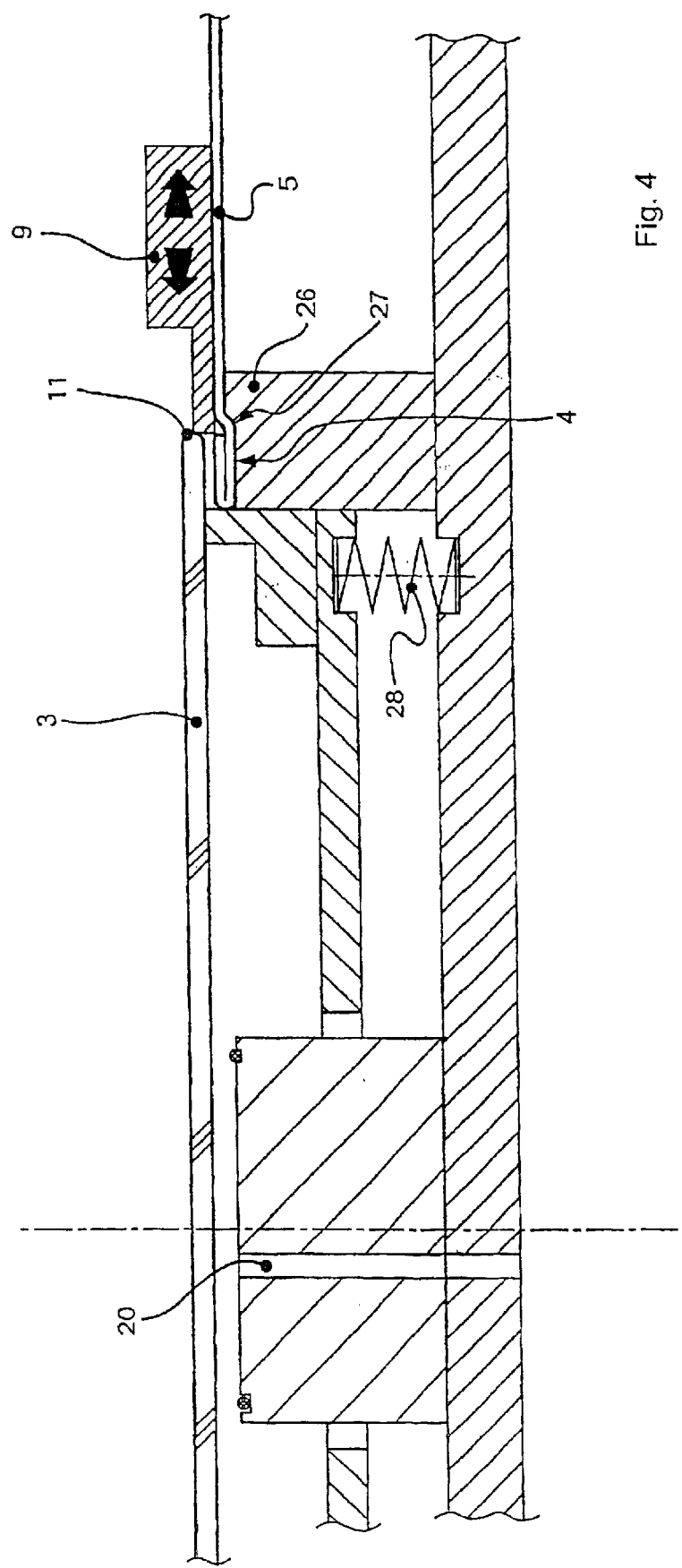
Figure 5:
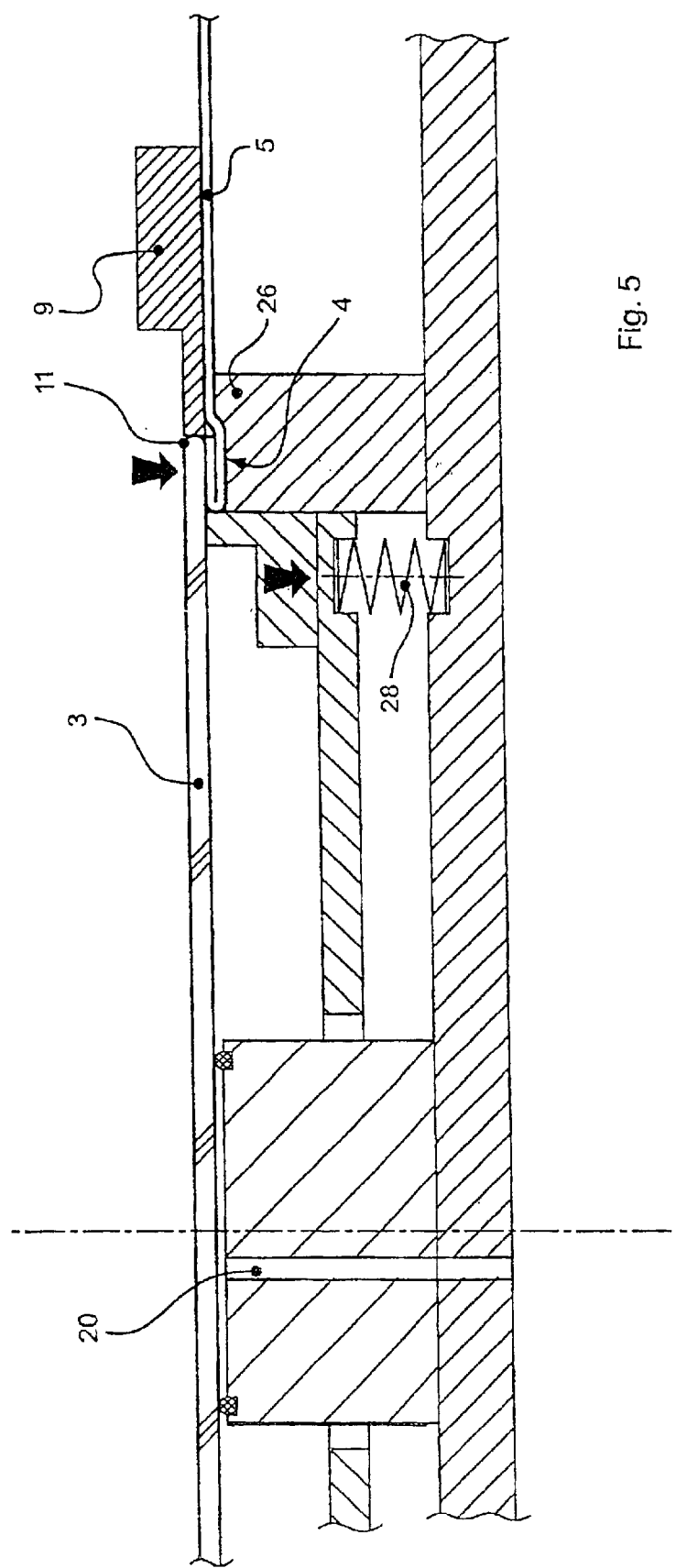
Figure 6:
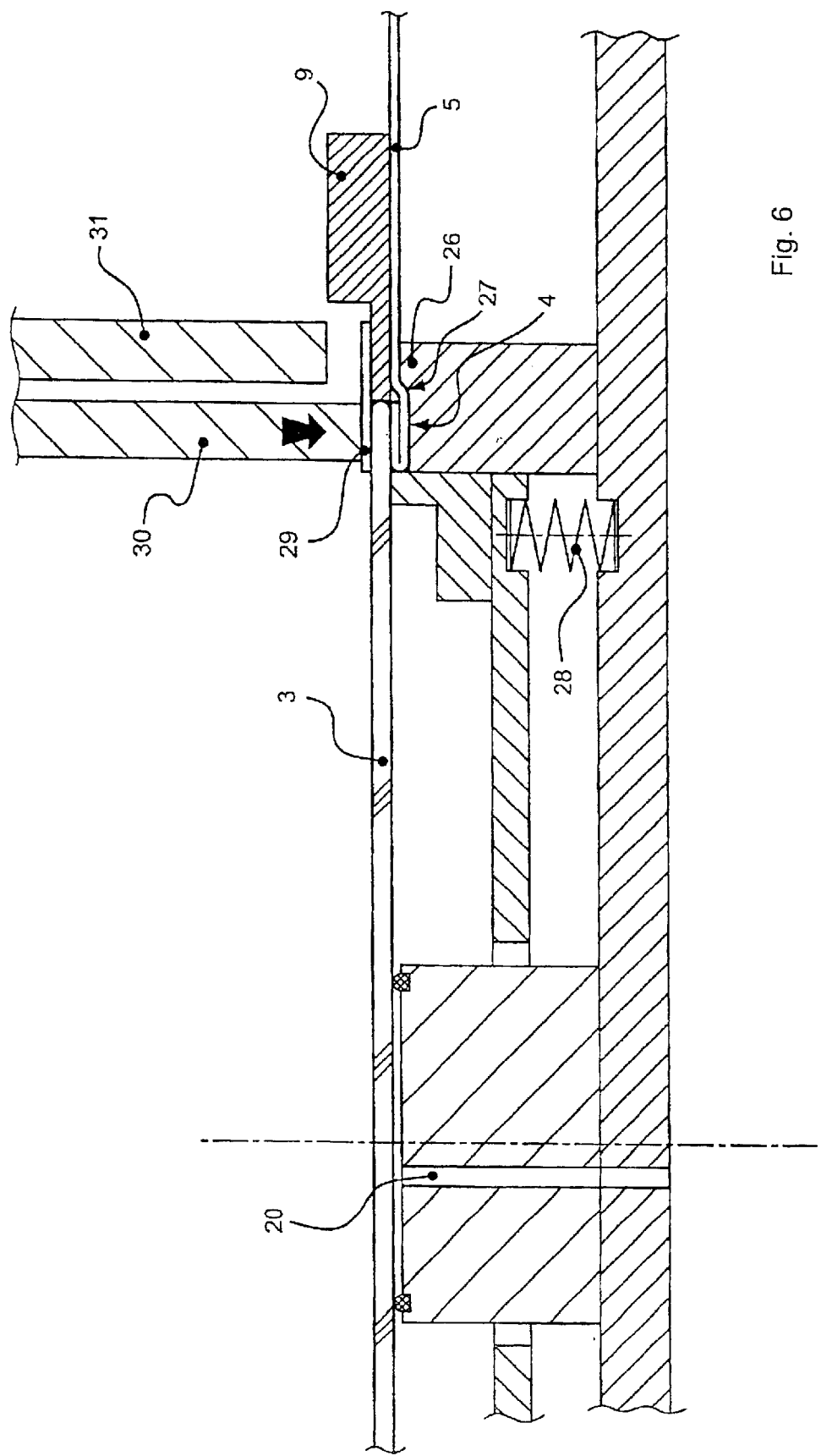
Figure 7:
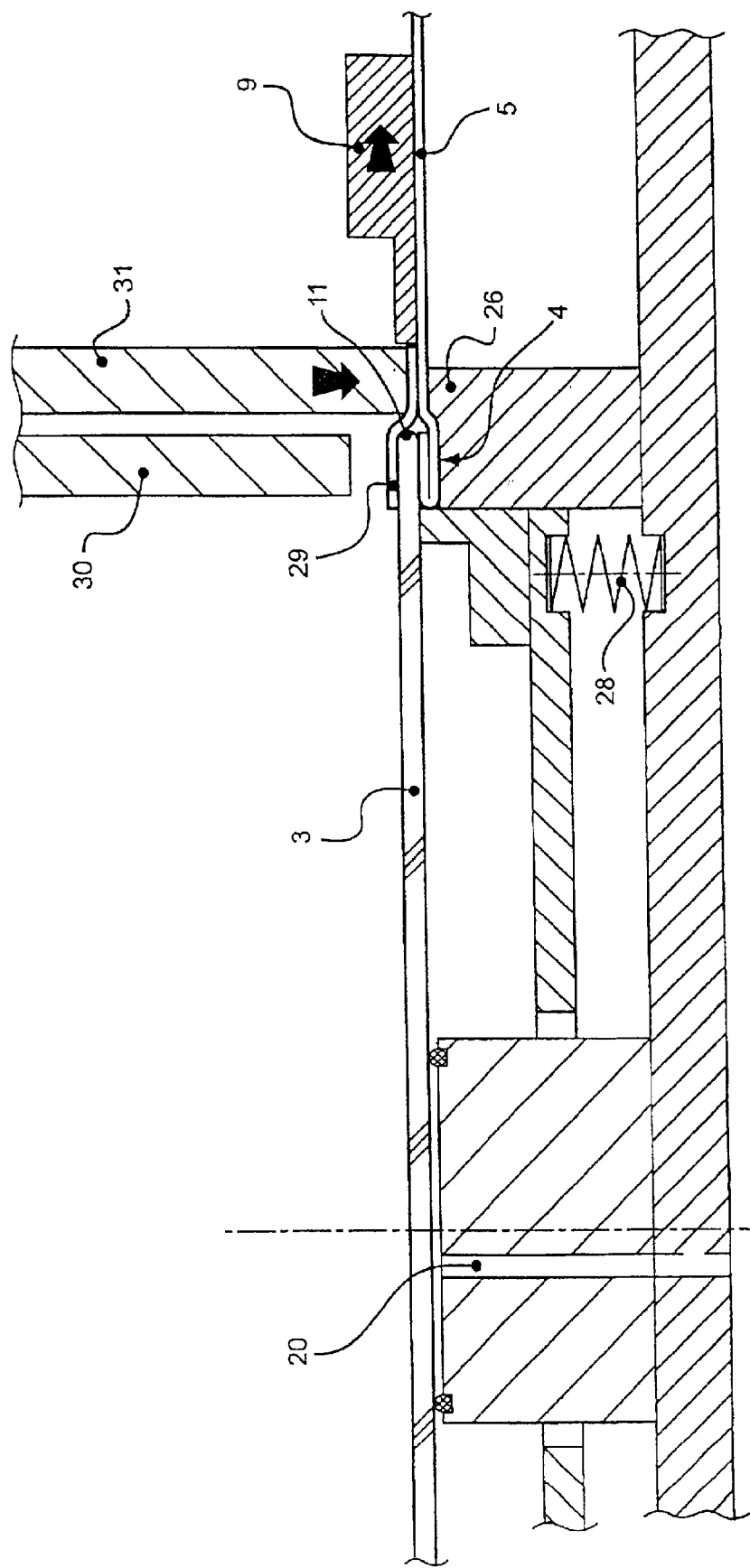
Figure 8:
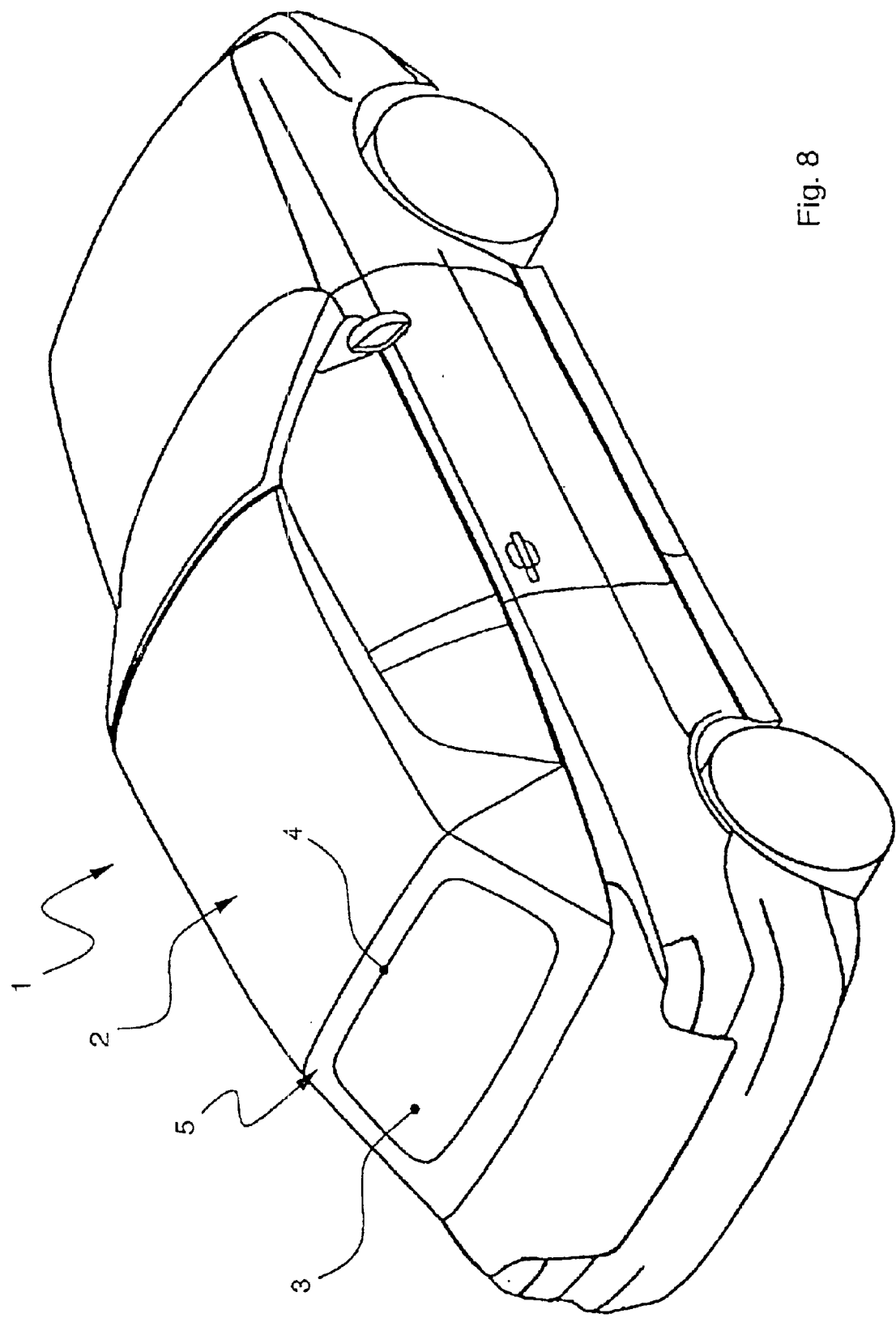

FIG. 1 shows a device of the present invention with a subassembly opened and after insertion of a part of a folding top, encircling a frame region, in a perspective view, FIG. 2 shows the device of FIG. 1 after a windowpane is provided and fixed, FIG. 3 shows a plan view of the device in the position of FIG. 2 with driving elements for moving thrust elements being shown by broken lines, FIG. 4 shows a section along the line IV—IV of FIG. 3, FIG. 5 shows a view, similar to that of FIG. 4, after vacuum fixing, FIG. 6 shows a view, similar to that of FIG. 5, during welding or gluing of a frame part, as well as of a covering strip with the windowpane, FIG. 7 shows a view, similar to that of FIG. 6, during the welding or gluing of the covering strip treating the part of the folding top, which embraces the frame region for the rear window, and FIG. 8 shows a convertible vehicle with a folding top, produced by the method of the present invention, shown in a perspective view.

DESCRIPTION OF THE PREFERRED EMBODIMENTS

A convertible vehicle 1, shown in FIG. 8, has a folding top 2, which is provided with a rear window 3, which is bordered by a frame region 4.

A device 6 of FIG. 1 is provided in order to make possible the connection between the part 5 of the folding top 2, encircling of the frame region 4.

The device 6 comprises a support 7 for the part 5 of the folding top 2, encircling the frame region 4. The frame region 4 can be provided so that it embraces a windowpane 3 completely or partly. The support 7 can be constructed, so that the part 5 can be held completely on it; this is also possible in the case of a flexible part 5, for example, by folding in regions of the part 5.

The device 6 furthermore comprises a fixing device, which has been labeled 8 as a whole, for the accurately fitting alignment and holding of the windowpane 3 in the device 6. The fixing device 8 comprises individual elements 9, which act on the windowpane 3 and, and the same time, are able to fix and hold it in the processing position. In the example, the elements 9 are constructed as thrust elements; this is not absolutely necessary.

The thrust elements 9 are held in sliding-block guides 10, which are essentially at right angles to the edge 11 of the inserted to windowpane 3 and necessarily impose a specified path of motion on the thrust elements 9, essentially at right angles to the edges 11 of the windowpane 3. At least one driving device 12, which actuates several or all thrust elements 9 over a revolving linkage 13, is provided for moving the thrust elements. The movement of the thrust elements 9 therefore necessarily is synchronized.

A linkage 13, which can be actuated over two synchronized driving devices 12, is connected at a coupling site 14, is shown in FIG. 3. Instead of the two driving devices 12, which are shown, one would also suffice, provided that coupling 14 makes it possible to lock the thereby connected linkage appropriately.

The revolving linkage 13 is connected over force-transmitting levers 16 which can be swiveled about fixed fulcrums 15 with frame bodies 17, which move the thrust elements 9. In the example, in each case two thrust elements 9 are taken up in a frame body 17. In the case of a pulling motion of the linkage 13 in the direction of the arrow 18, the frame bodies 17 can be moved by pulling in the piston rods of the driving device 12 to move the levers 16, swiveling them about the axes of rotation 15. Because the thrust elements 9, on the one hand, are accommodated in the frame bodies 17 and, on the other, are guided in the sliding-block guides 10, the thrust elements 9 can move perpendicularly only to the extent of these sliding-block guides 10. The conversion of the swiveling motion of the levers 16 into strictly a transverse movement of the thrust elements 9 comes about because the levers 16 engage the frame bodies 17 in elongated holes 19, as a result of which the swiveling component of the movement of the levers 16 is intercepted and only the lifting motion of the thrust elements 9, acting perpendicularly to the windowpane 3, remains. Due to the rotating linkage 13, it is ensured that all thrust elements 9 are moved in the same manner so far that, with the windowpane 3 inserted, all thrust elements exert pressure with the same force on the edge 11 of the windowpane 3. At the same time, the windowpane reaches its fixed end position, in which it can be held by a vacuum pump 20 below the plane of the extension of the windowpane.

The fixing device 8 is disposed as a whole at a subassembly 21, which can be moved between an open position (FIG. 1) and a closed position (FIG. 2). For this purpose, the subassembly 21 comprises two supporting frames 22, 23, which are laterally fastened and can be swiveled about horizontal axes. In the open position, the supporting frames 22, 23 are essentially vertical and therefore do not affect the access to the support 7.

The supporting frames 22, 23, actuated by motor or by hand, can be shifted using handles 24 into the closed position of FIG. 2.

As can be seen in FIG. 4, the folding top part 5, in order to connect it with the windowpane 3, is taken up with the frame region 4 overlapping the windowpane edge and contacted by a lower electrode 26 in such a manner that, due to the stepped configuration of the electrode 26, the sewing or gluing of the bend of the frame region 4 is taken into account. The turned-down part of the frame region 4 is therefore supported in such a manner that, in the turned down region as well as in the thereon adjoining single-layer region of the folding top part 5, the upper surface is at the same level, so that the thrust elements 9 can be shifted into their path of motion without a shoulder and the lower edge region 11 of the windowpane 3 is gripped from below by a flat, undergrasping part of the folding top 5.

The shoulder 27 is aligned parallel to the edge 11 of the windowpane and runs around the window pane 3 in the whole frame region 4.

For welding, gluing, reactive gluing, weld gluing or a similar connection between the windowpane 3 and the frame region 4, the part 5, which includes the frame region 4, is placed, to begin with, in the device 6, the sub-assembly 21 being in the open position and therefore not interfering with the insertion. The sub-assembly 21 is subsequently closed and the window pane, here the rear window 3 is placed down. A force 13 is exerted by the driving device or devices 12 on the linkage parts in such a manner, that the thrust elements 9, which are disposed around the inserted rear window 3, are moved centrally towards one another and, in so doing, always reach the same end position, in which the windowpane 3 can be shifted from any direction into the fixed end position. The path of motion of the thrust elements 9 extends parallel to the extent of the plane of the windowpane.

In this position (FIG. 4), a vacuum suction 20 for the windowpane 3 is activated, so that the latter is placed in the now fixed position on the frame region 4 of the folding top part 5. This work is carried out against the force of a support spring 28.

The actual connecting process by weld gluing or other thermal methods is carried out in two steps and shown in FIGS. 6 and 7. To begin with, an inner covering strip 29, which borders the edge region of the window pane 3 in about the same width as the frame region 4, is placed on the so fixed and lowered window pane 3. By lowering an upper electrode 30, which also extends over this width, for a defined period of time, heat is introduced into the connecting zone, as a result of which the welded or glued connection, for example, a reactive glue connection, is brought about. After that, the fixing of the windowpane 3 by means of the thrust elements 9 is undone. These therefore move, as can be seen in FIG. 7, to the outside and thus free a region, in which the covering strip 29 lies free above the outer layer of the folding top part 5, comprising the frame region 4. By lowering the second electrode 31, heat can be introduced (FIG. 7) into a region, which lies outside of the edge 11 of the windowpane and in which the covering strip 29 and the outer layer of the part 5 are pressed onto one another and connected with one another.

With that, the windowpane is bordered on both sides on the inside by the covering strip 29 and on the outside by the outer part 5, placed on the bend, the appearance and the mechanical stability thus being improved. The extent of the region of the folding top part 5, having the bend, can be kept very small by the shoulder 27 so that, contrary to what was the case with previous devices, it is no longer necessary to create an overlapping region, which is several centimeters in size.

What is claimed is:

1. A method for connecting windowpane to a folding roof, comprising the steps of:
    providing the folding roof with a frame region peripherally surrounding an opening for the windowpane;
    aligning the windowpane on the frame region such that a first peripheral window edge region of a first side of the windowpane faces and overlaps the frame portion and fixing the windowpane in position;
    aligning a covering strip, for surrounding and covering the windowpane, on the windowpane and the folding roof such that an inner peripheral region of the covering strip faces and overlaps a second peripheral window edge region of a second side of the windowpane, and an outer peripheral region of the covering strip faces and overlaps an outer frame region of the folding roof which surrounds the frame region and the windowpane;

in a first heat applying step, applying heat via a first electrode to the inner peripheral region of the covering strip, the first and second peripheral window edge regions, and the frame region to effect bonding therebetween; and in a second heat applying step following the first heat applying step, applying heat via a second electrode, movable relative the first electrode in alternative succession, to the outer peripheral region of the covering strip, and the outer frame region to effect bonding therebetween.

2. The method of claim 1 wherein:

the aligning step includes moving the windowpane to a position aligned with the frame region by moving holding elements into an engagement position engaging side edge portions of the windowpane;

the first heat applying step is conducted with the holding elements in the engagement position; and the second heat applying step includes moving the holding elements to a disengagement position moved away from the windowpane prior to the applying of heat via the second electrode.

3. The method of claim 2 wherein the method includes:

mounting the holding elements in a subassembly which is movably supported on a base assembly and the step of aligning includes:
moving the subassembly to a position allowing access to a support surface of the base assembly;
aligning the frame region at a predetermined position on the support surface;
placing the windowpane on the frame region;
moving the subassembly to a closed position; and
moving the holding elements into the engagement position to align the windowpane with the frame region.

4. The method of claim 2 wherein the holding elements are mutually moved by a moving mechanism to engage the windowpane on all sides when in the engagement position.

5. The method of claim 4 wherein the holding elements are mutually moved in sliding block guides substantially at right angles to the side edge portions of the windowpane.

6. The method of claim 5 wherein the method includes:

mounting the holding elements in a subassembly which is movably supported on a base assembly and the step of aligning includes:
moving the subassembly to a position allowing access to a support surface of the base assembly;
aligning the frame region at a predetermined position on the support surface;
placing the windowpane on the frame region;
moving the subassembly to a closed position; and
moving the holding elements into the engagement position to align the windowpane with the frame region.

7. The method of claim 6 wherein the method further comprises the steps of:

providing the frame region with a fold overlap wherein an overlap portion is situated at a common level with the folding top and faces and defines a width of the frame region which corresponds in width to the first peripheral window edge region of the first side of the windowpane; and providing a support surface electrode in the support surface for effecting heating, the support surface electrode having a stepped configuration for accepting the fold overlap such that the overlap portion is situated at the common level with the folding top, the support surface electrode being operable in combination with the first and second electrodes.

8. The method of claim 1 wherein the method further comprises the steps of:

providing a support surface for supporting the folding top;

providing the frame region with a fold overlap wherein an overlap portion is situated at a common level with the folding top and faces and defines a width of the frame region which corresponds in width to the first peripheral window edge region of the first side of the windowpane; and providing a support surface electrode in the support surface for effecting heating, the support surface electrode having a stepped configuration for accepting the fold overlap such that the overlap portion is situated at the common level with the folding top, the support surface electrode being operable in combination with the first and second electrodes.

9. The method of claim 8 wherein:

the aligning step includes moving the windowpane to a position aligned with the frame region by moving holding elements into an engagement position engaging side edge portions of the windowpane;

the first heat applying step is conducted with the holding elements in the engagement position; and the second heat applying step includes moving the holding elements to a disengagement position moved away from the windowpane prior to the applying of heat via the second electrode.

10. The method of claim 9 wherein the holding elements are mutually moved by a moving mechanism to engage the windowpane on all sides when in the engagement position.

11. The method of claim 10 wherein the method includes:

mounting the holding elements in a subassembly which is movably supported on a base assembly including the support surface, and the step of aligning includes:
moving the subassembly to a position allowing access to the support surface of the base assembly;
aligning the frame region at a predetermined position on the support surface;
placing the windowpane on the frame region;
moving the subassembly to a closed position; and
moving the holding elements into the engagement position to align the windowpane with the frame region.

12. The method of claim 9 wherein the method includes:

mounting the holding elements in a subassembly which is movably supported on a base assembly including the support surface, and the step of aligning includes:
moving the subassembly to a position allowing access to the support surface of the base assembly;
aligning the frame region at a predetermined position on the support surface;
placing the windowpane on the frame region;
moving the subassembly to a closed position; and
moving the holding elements into the engagement position to align the windowpane with the frame region.

* * * * *